June 21, 1927.
G. R. KNOTWELL
TRACTOR GUIDE
Filed Dec. 8, 1926
1,633,334
2 Sheets-Sheet 1
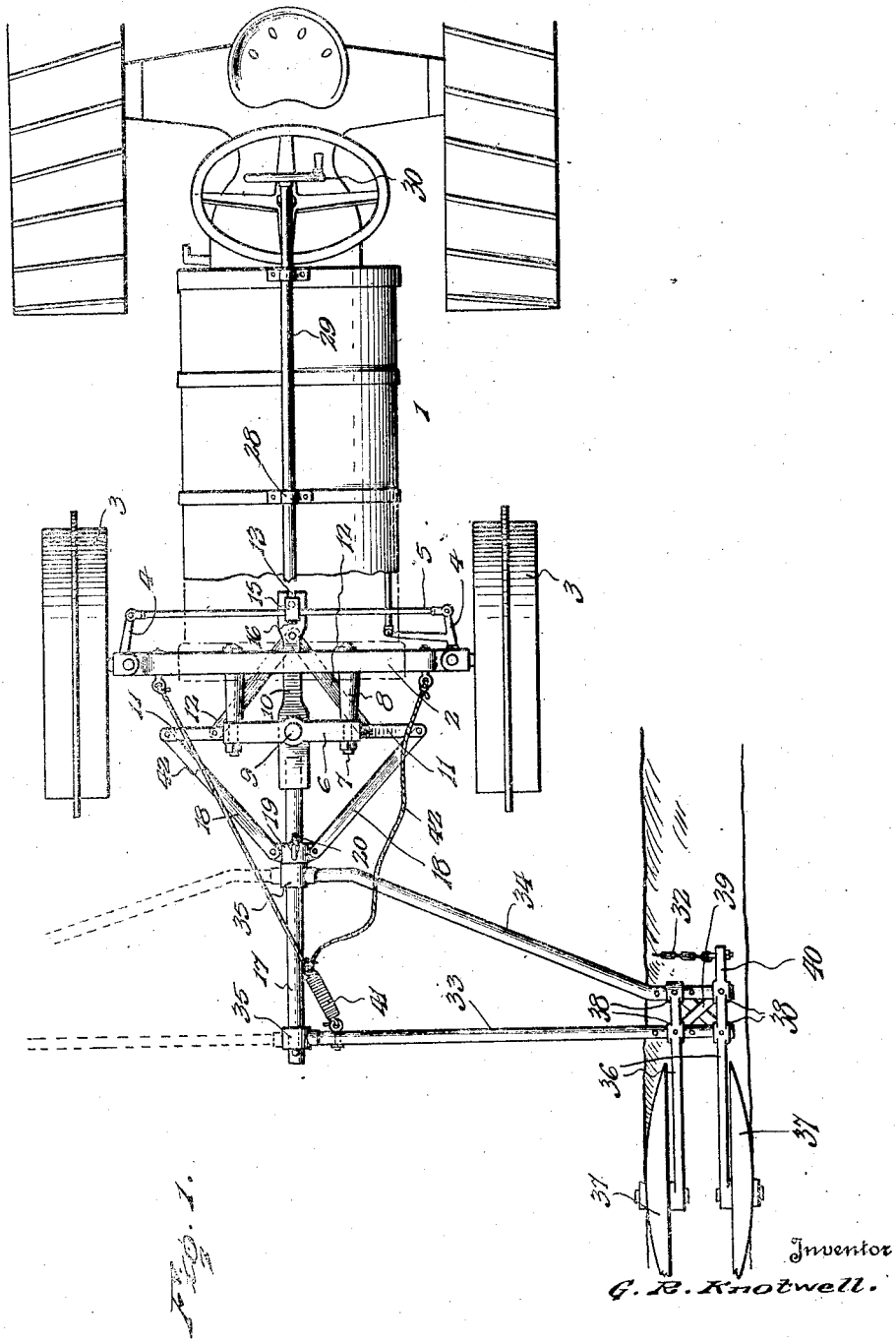
Inventor
G. R. Knotwell.
By Lacey & Lacey, Attorneys

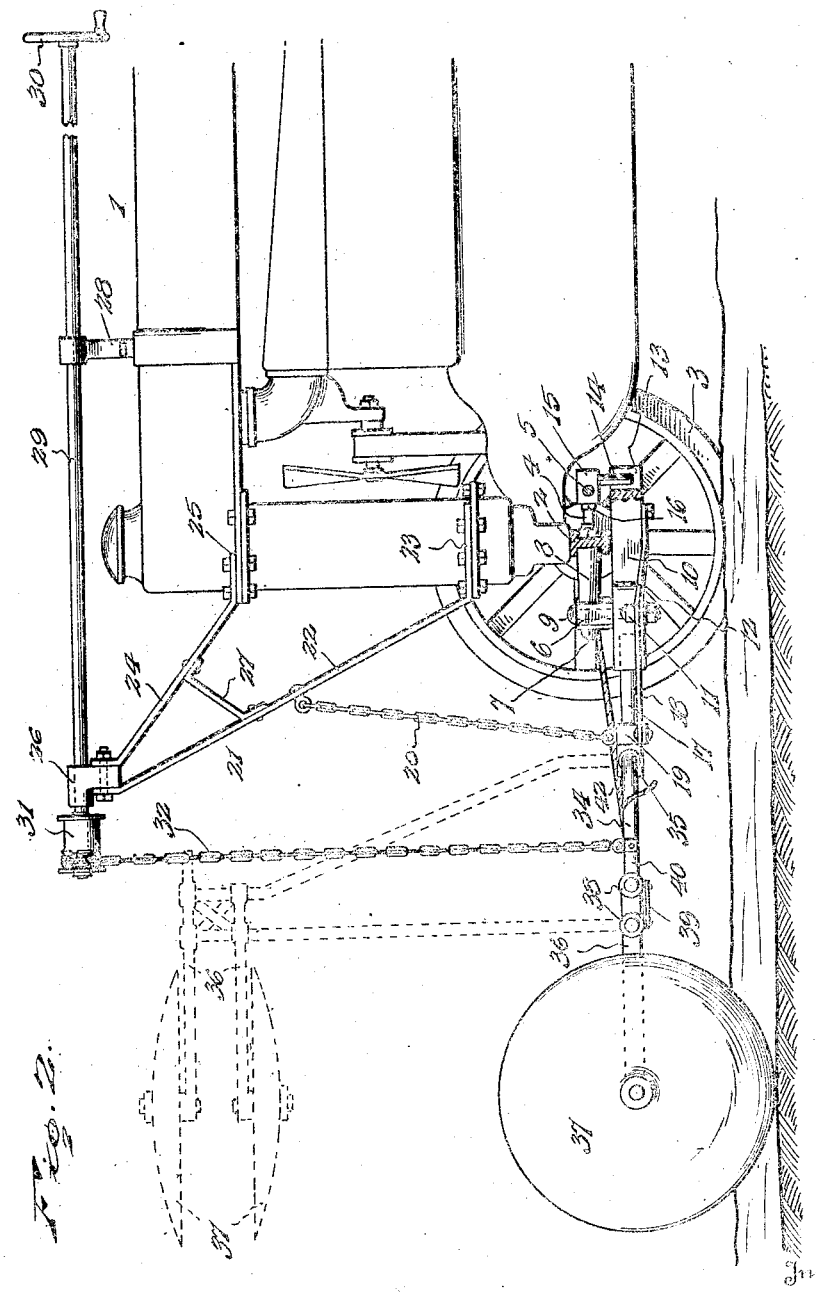

Patented June 21, 1927.

UNITED STATES PATENT OFFICE.

GLENN R. KNOTWELL, OF WAUNETA, NEBRASKA, ASSIGNOR OF ONE-HALF TO EARL W. SKELTON, OF WAUNETA, NEBRASKA.

TRACTOR GUIDE.

Application filed December 8, 1926. Serial No. 153,387.

This invention relates to attachments for tractors used to impart travel to agricultural implements, and the object of the invention is to provide a simple mechanism which may be readily mounted upon the front end of the tractor to guide the same in its travel so that it will be held to a path parallel with a previously formed furrow. The invention also seeks to provide a mechanism for the stated purpose which may be readily shifted to work at either side of the path of the tractor and which may be also quickly disposed in an inoperative position when the tractor is to be moved from field to field. Other incidental objects of the invention will appear in the course of the following description, and the invention resides in certain novel features which will be particularly pointed out in the appended claims.

In the drawings:

Figure 1 is a plan view, partly broken away, of one embodiment of my invention applied to a tractor, and Fig. 2 is a side elevation of the same.

The tractor, indicated conventionally at 1, may be of any known or approved construction and is equipped with a front axle 2, at the ends of which are mounted the usual steering wheels 3 mounted for simultaneous operation through the action of spindle arms 4 and a tie rod 5 extending between said spindle arms.

In carrying out the present invention, there is provided a cross bar 6 which is disposed in advance of the axle 2 and is secured rigidly thereto by bolts 7 inserted through the axle and carrying spacing sleeves 8 whereby the cross bar is maintained in the proper spaced relation to the axle. Extending centrally through the cross bar 6 is a king bolt 9, upon the lower end of which is mounted a head 10, said head consisting of a central longitudinally extending shank and lateral arms 11 projecting from the opposite sides of the shank and braced thereto by rearwardly converging bars 12 secured to the rear portion of the shank and to the outer end portions of the said arms, as will be understood upon reference to Fig. 1. The rear end of the head 10 is provided with a longitudinally extending notch or open-ended slot 13 which receives a pin 14 depending from a block 15 which is rigidly secured upon the tie rod 5 in any convenient manner, as by means of a set screw, indicated at 16. It will thus be seen that, if the head 10 be moved pivotally about the king bolt 9, the motion of the rear end of the head will be transmitted to the tie rod 5 through the pin and slot connection and, consequently, the steering wheels 3 of the tractor will be set in angular position to guide the machine. In the forward end of the head 10 is a socket receiving a bar 17 which is preferably circular in cross section and may be threaded into the socket so as to be firmly secured to the head. Forwardly converging bracing bars 18 are secured at their rear ends to the outer ends of the arms 11 and have their front ends attached to a collar 19 encircling the bar 17 so as to resist lateral bending strain upon the said bar, and to further support the said bar a chain or cable 20 is attached to the collar 19 and extends upwardly therefrom to be secured to a mast 21 carried by the front end of the tractor. This mast comprises a lower member 22 of structural metal having its lower end extended rearwardly and bolted to the lower flange of the tractor radiator, as shown at 23, and an upper similar member 24 which has its rear end bolted to the upper flanges of the radiator, as shown at 25. The mast members 22 and 24 converge forwardly and upwardly and carry at their upper extremities a sleeve or bearing block 26 while they are connected intermediate their ends by a brace 27 in order to attain the desired strength and rigidity. Mounted upon the tractor, as upon the top of the fuel tank, is a bearing post 28 alined axially with the bearing block 26, and in these said members is rotatably mounted a winding rod or shaft 29 which extends to a point adjacent the operator's seat where it is equipped with a hand wheel 30. Upon the front end of the said winding shaft is a drum 31 to which is attached a chain or cable 32 adapted to wind thereon.

Mounted upon the bar 17 for relative rocking movement are a pair of laterally extending arms 33 and 34 which are formed at their inner ends with hubs 35 rotatably encircling the bar 17, as will be understood, while the arms converge outwardly and have their outer extremities disposed in parallelism, as clearly shown in Fig. 1. Fitted upon the outer parallel extremities of the arms 33 and 34 are a pair of carrier arms 36 which extend forwardly and have guiding disks mounted upon their forward ends to roll upon the ground within a furrow and in contact with the side walls of the furrow, as will be understood upon reference to the drawings. The rear ends of the carriers 36 are provided with hubs 38 fitted upon the outer ends of the respective arms 33 and 34 so that a firm support for the carriers will be provided and movement vertically of the same and the guiding disks relative to the supporting arms will be prevented, and braces 39 may be attached to the said hubs in order to impart additional rigidity to the structure. The outer carrier 36 is provided with a rear extension 40 to which the lower end of the chain or cable 32 is attached, as shown. A spring 41 is attached to the front arm 33 adjacent the inner end thereof, and cables or chains 42 are attached to the said spring and extend rearwardly therefrom in diverging relation to be secured to the respective ends of the axle 2, as clearly shown in Fig. 1. When the apparatus is in use, the cable or chain 42 which is at the side of the machine remote from the guiding disks will be taut so that it serves to resist the side draft imposed upon the machine while in action.

It is thought the use of the device will be readily understood from the foregoing description, taken in connection with the accompanying drawings. When in use, the arms 33 and 34 are lowered to extend to one side of the tractor and bring the guiding disks 37 into position within a furrow alongside of which the machine is to travel. As the machine travels over the field, the guiding disks 37 will, of course, follow the walls of the furrow and will, consequently, tend to impart lateral movement to the arms 33 and the bar 17 which movement will be transmitted directly to the head 10 and thence to the steering wheels of the tractor, as has been previously described. Consequently, the tractor will be held to a path parallel to the furrow in which the guiding disks are traveling. When the end of a row has been reached, the winding shaft 29 is rotated by manipulation of the hand wheel 30 and the chain or cable 32 is wound upon the drum 31 so that the arms 33, 34 will be swung upwardly and may be shifted to the opposite side of the bar 17 to position the apparatus for use upon a return trip, or, if the machine is to be moved to another field, the said arms and the guiding disks may be maintained in the upright position indicated in dotted lines in Fig. 2, so that the disks will be free of the ground and the tractor may then be driven to another point in the usual manner. In shifting the guiding disks from one side to the other side of the tractor, the winding shaft is first rotated in one direction to raise the arms 33 and 34 and is then permitted to rotate in the opposite direction so as to lower the arms after they have passed the central vertical plane of the tractor and the reverse rotation of the shaft may be manually controlled so as to avoid such forcible dropping of the apparatus as might result in damage to some of the parts. The guiding attachment may be used when the tractor is drawing breaking plows in order that the furrow being formed will be parallel with the previously formed furrow or may be used when listing. The guiding disks are so proportioned that the disk-carrying members and the supporting arms have ample clearance over the ridge when operating at either side of the tractor. The apparatus is very simple and compact and may be readily applied to any known form of tractor.

Having thus described the invention, I claim:

1. Apparatus for the purpose set forth comprising a supporting rod, means for supporting said rod upon the front axle of a tractor and operatively connecting the same with the steering gear of the tractor, laterally extending arms mounted upon said rod for rocking movement, carriers on the outer ends of said arms, guiding disks mounted upon the free ends of said carriers, means for rocking the arms about the supporting rod, a spring attached to one of said arms near the inner end thereof, and flexible connections between the said spring and the ends of the tractor axle.

2. Apparatus for the purpose set forth comprising a mast to be secured upon the front end of a tractor, a carrying structure secured to the front axle of the tractor, a head pivotally mounted on said carrying structure and operatively connected with the steering gear of the tractor, a rod mounted in and extending forwardly from said head, a connection between the mast and said supporting rod, laterally extending arms mounted upon the supporting rod, guiding disks carried by the outer ends of said arms, a winding shaft mounted on the upper end of the mast, a drum on said shaft, and a flexible connection between the drum and the said lateral arms.

In testimony whereof I affix my signature.

GLENN R. KNOTWELL. [L. S.]